United States Patent [19]
McClure

[11] 4,398,229
[45] Aug. 9, 1983

[54] MAGNETIC HEAD WITH VERSATILE GAP

[75] Inventor: Richard J. McClure, San Diego, Calif.

[73] Assignee: Eastman Kodak Company, Rochester, N.Y.

[21] Appl. No.: 289,845

[22] Filed: Aug. 3, 1981

[51] Int. Cl.³ .......................... G11B 5/22; G11B 5/25; G11B 5/251
[52] U.S. Cl. .................................. 360/113; 360/119; 360/120
[58] Field of Search ........................ 360/113, 119, 120

[56] References Cited

U.S. PATENT DOCUMENTS

| | | | |
|---|---|---|---|
| 2,822,428 | 2/1958 | Wood | 179/100.2 |
| 2,928,906 | 3/1960 | Gernert | 179/100.2 |
| 3,043,919 | 7/1962 | Tannenbaum et al. | 179/100.2 |
| 3,480,935 | 11/1969 | Springer | 340/174.1 |
| 3,546,398 | 12/1970 | French | 179/100.2 |
| 3,549,824 | 12/1970 | Brewster | 179/100.2 |
| 3,591,729 | 7/1971 | Camras | 179/100.2 |
| 3,686,467 | 8/1972 | Camras | 179/100.2 C |
| 3,797,032 | 3/1974 | Kelley | 360/119 |
| 3,855,618 | 12/1974 | Koorneef et al. | 360/69 |
| 3,855,629 | 12/1974 | Koorneef et al. | 360/113 |
| 4,017,899 | 4/1977 | Bagby | 360/122 |

FOREIGN PATENT DOCUMENTS

| | | | |
|---|---|---|---|
| 1062026 | 7/1959 | Fed. Rep. of Germany | 360/119 |
| 53-114415 | 10/1978 | Japan | 360/119 |
| 860120 | 8/1981 | U.S.S.R. | 360/113 |

OTHER PUBLICATIONS

Physical Acoustics–Principles and Methods, vol. 1—Part A, edited by Warren P. Mason, Academic Press, Inc., 1964, p. 188.

*Primary Examiner*—George G. Stellar
*Attorney, Agent, or Firm*—Robert F. Cody

[57] ABSTRACT

Apparatus squeezes together, on selective command, the poles of a core having a gap of a given physical gap length, thereby to place the poles under stress. Stress decreases the permeability of the pole material. Attendantly, in response to the application of stress, the effective gap of the core lengthens. Release of the applied stress restores the effective gap length to that corresponding to the physical gap length. To increase pole stress, the invention employs a piezoelectric element that is bonded to the core across its gap. Application of an electrical signal (of predetermined polarity) to the piezoelectric element causes the element to contract, thereby squeezing the poles together.

10 Claims, 7 Drawing Figures

MAGNETIC HEAD WITH VERSATILE GAP

BACKGROUND OF THE INVENTION

1. Field of the Invention

This invention relates in general to magnetic transducers and in particular to a gapped magnetic head of the type in which the length of its gap is selectively alterable.

2. Description Relative to the Prior Art

There are many instances when it would be desirable to alter dynamically the effective length of the gap of a magnetic head. In the recording, for example, of video information on magnetic tape having high coercivity, it would be desirable to record the video information by means of a head having a fairly long record gap, thereby to maximize the level of recording flux. By contrast, it would be desirable to play back the recorded video information by use of a head having a playback gap that is extremely short, thereby to reproduce video signals of extremely short wavelength. The provision of a magnetic head having a "versatile gap" is, however, not new. U.S. Pat. No. 3,686,467, for example, discloses a variety of teachings for dynamically altering the effective length of a magnetic head gap. In certain embodiments of U.S. Pat. No. 3,686,467, the gap is formed of a layer of field-saturable magnetic material and a layer of non-magnetic material. By applying a saturating flux to the saturable material, the effective gap is lengthened; without the application of the saturating flux, however, the gap has an effective length that is equivalent to the thickness of the non-magnetic layer. Various techniques are indicated for saturating the saturable material. In another embodiment of U.S. Pat. No. 3,686,467, the gap is formed of a layer of non-magnetic material and a layer of magnetic material of low Curie temperature. By selectively heating the gap material, the gap assumes a length corresponding to the combined thickness of the non-magnetic and low-Curie-temperature materials; without the application of heat to the low-Curie-temperature material, however, the gap has a length corresponding to the thickness of the non-magnetic material. Other gap-altering techniques, stemming from the above-described general embodiments of U.S. Pat. No. 3,686,467, are also described in U.S. Pat. No. 3,686,467.

U.S. Pat. No. 4,346,417 in the name of Neil J. Griffith and assigned to the assignee hereof concerns the dynamic formation, and closure, of (a) gap(s) of precise dimensions. The disclosure of U.S. patent application Ser. No. 133,076 indicates a multitrack head having saturable material occupying completely the respective gap regions of the cores of the head. By magnetically saturating the gap material of one head core, that head core is turned ON; head cores which do not receive gap-saturating flux are, however, left in their respective OFF states. Since any head core which is OFF is, magnetically, of a toroidal form, inductive coupling between those cores which are OFF and the core which is ON cannot, inherently, cause the recording of ghost information by means of the OFF cores, i.e. induced flux is trapped within the "toroidal" OFF cores.

The invention, as will appear below, is practicable with either of the above-described concepts: the length of a core gap may be lengthened/shortened from one discrete size to another; or a core may be provided, or not, with an effective gap of a given discrete size.

SUMMARY OF THE INVENTION

The concept of the invention—as practiced in one embodiment thereof—is to squeeze together, on selective command, the poles of a core having a gap of a given physical gap length, thereby to place the poles under stress. Stress decreases the permeability of the pole material. Attendantly, in response to the application of stress, the effective gap of the core lengthens. Release of the applied stress restores the effective gap length to that corresponding to the physical gap length. To increase pole stress, the invention employs a piezoelectric element that is bonded to the core across its gap. Application of an electrical signal (of predetermined polarity) to the piezoelectric element causes the element to contract, thereby squeezing the poles together. Especially for a gapped core having poles of decreasing cross section in proximity to its gap, the piezo-produced stress in the vicinity of the core gap can reach astounding levels, whereby the permeability of the core material in such gap vicinity will, for all intents and purposes, lessen approximately to that of air. By selectively applying an electrical signal to the piezoelectric element, the effective gap of the core will, on command, increase in length and remain so until such electrical signal is removed from the piezoelectric element.

The invention will now be described further with reference to the figures, of which:

FIG. 3 is a schematic diagram useful in illustrating the operability of the technique employed in the practice of the invention;

FIG. 7 is an elevational view of a piezoelectric structure useful in the practice of the invention.

Figure 2:
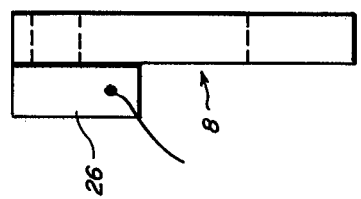
FIG. 2 is a side elevational view of the head of FIG. 1 taken along line 2—2 thereof.
Figure 1:
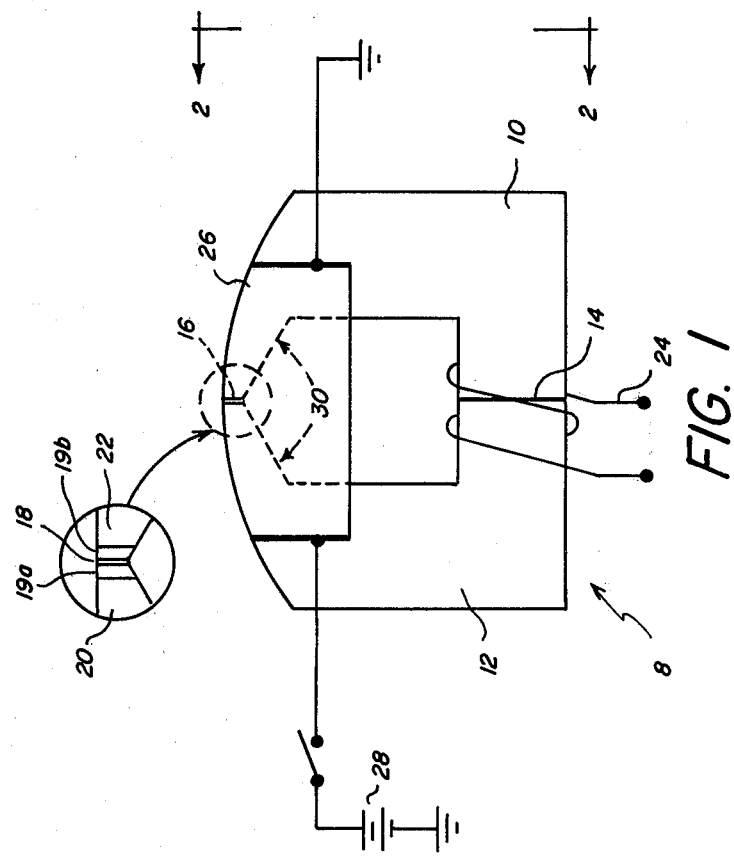
FIG. 1 is an elevational view of a magnetic head incorporating the invention.

With reference to FIGS. 1 and 2, a gapped magnetic head 8 is depicted as formed of first and second core halves 10,12 ... a low reluctance back gap 14 and a high reluctance transducer gap 16 being formed between the core halves. The transducer gap 16, in this embodiment of the invention, is comprised of one or more high reluctance films 18, e.g. SiO, sandwiched between films 19a,b of material, e.g. cobalt ($-50 \times 10^{-6}$) or cobalt zinc ferrite ($-250 \times 10^{-6}$), having a relatively high degree of stress-dependent permeability (high coefficient of magnetostriction). The films 19a,b are deposited on, and form part of, the respective poles 20,22 of the core halves 10,12. The core halves 10,12, which are bonded together by means known to those in the art of magnetic heads, may be made of any suitable core material such as ferrite. A coil 24 is wound on the head 8 for purpose of inducing magnetic signals in the head, and for producing electrical signals in response to magnetic flux that enters the gap of the head.

Bonded to, and extending across the gap 16 of the head 8, is a piezoelectric element 26. In this form of the invention, a voltage of appropriate polarity, when applied across the element 26 by means of a potential source 28, has the effect of causing the element 26 to contract, thereby causing the head poles 20,22 to squeeze together. The piezoelectric element 26 may take a variety of forms, e.g. barium titanate or lead zirconium titanate (PZT). More will be said about this later.

While the piezoelectric element 26 of FIGS. 1 and 2 is indicated as being bonded to the outside of the head 8 in the vicinity of the head poles, the head-to-element relationship may be such that the element serves (additionally) as an edge support piece to prevent side gap erosion of the ferrite that comprises the head 8; see U.S. Pat. No. 4,017,899. U.S. Pat. No. 4,017,899, which is assigned to the present assignee, indicates the use of a side support bonded to a head and supported against a shoulder cut into the cross section of the head.

Because of the tapering (30) of the core halves 10,12 in proximity to the head gap 16, whatever stress is injected into the core halves by voltage-induced contraction of the piezoelectric element 26 is magnified enormously at, and in, the shallow depth of the gap 16. Attendantly, the permeability of the magnetostrictive films 19a,b which serve to define the gap decreases, e.g. to that of air, whereby the effective gap length of the head 8 increases to the combined thicknesses of the films 18, 19a,b. Removal of the contraction-causing voltage from the piezoelectric element 26 causes the effective gap of the head to decrease in length to that corresponding to the thickness of the film 18. Thus, by selectively applying a voltage across the piezo-electric element 26, the head of FIGS. 1 and 2 may be converted, easily and quickly, from a narrow gap play head to a wide gap record head.

(The ferrite which comprises the core halves 10,12, in contrast to the highly magnetostrictive films 19a,b, experiences only a relatively slight change in permeability in response to its received stress. Indeed, a typical ferrite under tensile stress of as much as 10,000 pounds per square inch (psi) exhibited a permeability decrease of only a factor of three times. By contrast, the permeability change associated with stress in the films 19a,b may change by as much as a hundred fold.)

In the interest of providing a measure of the magnitude of the piezo-produced stresses associated with the head structure of FIGS. 1 and 2, an analysis of the forces involved in the operation of the head of FIGS. 1 and 2 was conducted. While schematic in nature, the views of FIG. 3 reflect the general construction of the head of FIGS. 1 and 2 . . . corresponding parts being similarly identified, save for the use of primes in FIG. 3. With the piezoelectric element 26' bonded to the head at points $P_1'$, $P_2'$ (single bond points $P_1'$, $P_2'$ are employed in this analysis—instead of a bond across the whole interface C'—in the interest of problem simplification), the piezoelectric element 26' acts as a "stiff" compression spring 26'' against the restraint of the head 8''. Were the piezoelectric element 26'' free to contract without restraint, it would contract, say, to a point corresponding to the displacement $\delta_u$; with restraint, however, the contraction of the piezoelectric element 26'' is limited to that corresponding to the displacement $\delta_R$.

It is known that (see *Physical Acoustics-Principles and Methods*, Volume I—Part A, edited by Warren P. Mason, Academic Press Inc., 1964, page 188, equation (20)) strain S, i.e. the differential change in length per unit length, associated with a piezoelectric element is governed by the following equation:

$$S = sT + dE \tag{1}$$

where
s is a stiffness constant corresponding to the reciprocal of Young's modulus for the piezoelectric element (Area/Force),
T is the stress within the piezoelectric element (Force/Area),
d is a piezo constant (Length/Volt), and
E is the applied electric field (Volt/Length), applicable across the piezoelectric element.

Equation (1), in more conventional form, translates to $$\frac{\partial R}{L} = s\left(\frac{-F}{A_P}\right) + dE \tag{2}$$

where L is the length of the piezoelectric element,
F is the force applied at points $P_1'$,$P_2'$ (the negative sign associated with the force F in equation (2) indicating that the force is compressive against the restraint), and
$A_P$ is the cross-sectional area of the piezoelectric element.

Because of the extreme stiffness of the (ferrite) core halves, it will be assumed in this analysis that the restraint has an effective length of L/20, this being a reasonable assumption since it is only at the poles 20', 22' that compressive stress is exceedingly high. Also, in the interest of further simplification, it will be assumed for the moment that the restraint is not of a tapered configuration, but rather rectangular, its areal cross section $A_R$ being approximated at one-twentieth the cross-sectional area $A_P$ of the piezoelectric element 26'. Thus, per Hooke's Law, $$\partial R = \frac{F\left(\frac{L}{20}\right)}{A_R Y_R} \tag{3}$$

where
$Y_R$ is Young's modulus for the "restraining" pole (20',22') material.

Combining equations (2) and (3) yields $$Ls\left(\frac{-F}{A_P}\right) + LdE = \frac{F\left(\frac{L}{20}\right)}{A_R Y_R} \tag{4}$$

which, in terms of the stress F/Ar within the pole (20',22') material, translates to $$\frac{F}{A_R} = \frac{dE}{s\frac{A_R}{A_P} + \frac{1}{20 Y_R}} \tag{5}$$

Given that, by approximation, $A_R = A_P/20$, equation (5) further reduces $$\frac{F}{A_R} = \frac{dE}{\frac{s}{20} + \frac{1}{20 Y_R}} \tag{6}$$

and

-continued $$\frac{F}{A_R} = \frac{20 \, dE}{s + \frac{1}{Y_R}} \quad (7)$$

Assuming that the piezoelectric element 26' is comprised of PZT-5 (identified in the abovereferred to text by Mason), the following piezo constants therefor obtain:

$$s_{33} = 18.8 \times 10^{-12} \frac{\text{meter}^2}{\text{Newton}}$$

$$d_{33} = 374 \times 10^{-12} \frac{\text{meters}}{\text{volt}}$$

$$E = 6 \times 10^5 \frac{\text{volts}}{\text{meter}},$$

the latter constant E being a typical manufacturer's rating for the maximum voltage applicable without stressing the element 26' into a damaged state. (The first and second digit of the subscripts for the constants s and d identify respectively which of three axes of a piezoelectric element receives the applied field and in which direction strain is to be measured. The use of such subscripts is well known in the art of piezoelectrics, and different constants are associated with different piezoelectric elements and with the different axes of any given element.)

Assuming a typical value for the modulus $Y_R$ of the (ferrite) pole (20',22') material to be $10 \times 10^7$ psi ($6.89 \times 10^{10}$ n/m²), and substituting the values of the above constants and modulus in equation (7) yields a stress across the area $A_R$ of the (ferrite) pole material of $1.347 \times 10^6$ n/m² (3866 psi). It will be appreciated that while a stress of almost 3900 psi is itself quite large, the fact that the poles 20', 22' taper down (to a typical miniscule area of only about $2 \times 10^{-5}$ in.²) from the cross-sectional area $A_R$ means that stress at the gap-defining tips of the poles 20',22' could reach an astronomical level. For example, in the event of a typical area $A_R = 0.002$ in.² (track width=0.001 in.; L/20=0.2 in.), the area of the pole material would change a hundred fold as the pole(s) taper(s) toward the gap, resulting in the pole tip material being stressed in such case to about $3.9 \times 10^5$ psi, given the above-described arrangement of components.

Figure 4:
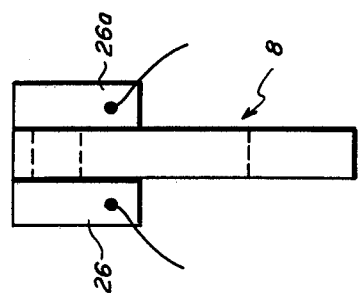
FIG. 4 is a side elevational view, like that of FIG. 2, but illustrating another embodiment of the invention.

The above analysis has been presented in the interest of demonstrating the kinds of stresses which may be piezo-generated in the vicinity of the gap of a magnetic head. Certainly, the amount of stress necessary to alter sufficiently the permeability of the layers 19a,b will depend on the specific nature of the layer material, as well as on the geometry of the head parts, and on the nature of the piezoelectric element. Should additional stress be necessary, or desired, the geometry of the pole taper 30, may, for example, be modified; or the gap depth may be decreased. Additionally, as shown in FIG. 4, a complementary piezoelectric element 26a may be bonded across the free side of the head 8, thereby effectively doubling the magnitude of the available force for stressing the layers 19a,b into a non-magnetic state.

The field rating parameter E of a piezoelectric element, as identified above, represents the maximum field (for maximum displacement δ) that may be applied across a piezoelectric element without causing damage to the element. Thus, in FIGS. 1-3, depending on the length L of the piezoelectric element 26, and on the amount of stress necessary to implement the invention, the magnitude of the applied field across the piezoelectric element 26 could, in some applications, prove objectionably large. In such cases, either the configuration of FIGS. 5 and 6, or by use of one or more piezoelectric elements as in FIG. 7, may be employed.

Figure 6:
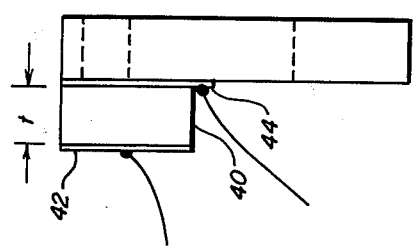
FIG. 6 is a side elevational view of the head of FIG. 5 taken along line 6—6 thereof.
Figure 5:
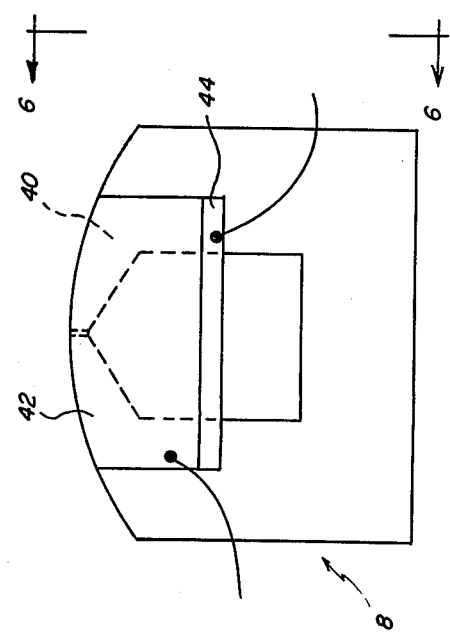
FIG. 5 is an elevational view of another form of the invention.

Referring to FIGS. 5 and 6, the magnetic head 8 is provided with a stress-producing piezoelectric element 40 secured to and bridging its gap. The piezoelectric element 40 has first and second electrodes 42,44 disposed, not at opposite ends of the element's long dimension, but rather on opposite sides of the element's thin dimension. Attendantly, by utilizing the smaller dimension t for field application purposes, a smaller voltage across the electrodes 42,44 may be employed to maximize the contraction of the element 40, albeit by an amount less than that available with the configuration of FIGS. 1-3.

FIG. 7 depicts a configuration for a piezoelectric element 48 in which the stress-producing voltage is applicable across electrodes 50,52 disposed at opposite ends of the long dimension of the element. To lessen the requisite voltage necessary to maximize its displacement, though, the element 48 of FIG. 7 is comprised of a succession of thin piezoelectric laminae, alternate ones of which are provided with electrodes connected respectively to the electrodes 50 and 52. Such a configuration provides maximum displacement for any given voltage applied to it.

The invention has been described in detail with particular reference to preferred embodiments thereof, but it will be understood that variations and modifications can be effected within the spirit and scope of the invention. For example, each of the following adaptations would be within the purview of the invention:

(1) A gap having no magnetostrictive material therein, the core material being of such a nature that significant magnetostriction occurs only in the highly stressed regions of the gap.

(2) Highly magnetostrictive material fully occupying the gap, whereby the gap may be turned ON and OFF in a manner akin to that of U.S. Pat. No. 4,346,417.

(3) Different layers of different kinds of magnetostrictive material in a gap, whereby different gap lengths may be created depending on the level of stress applied to the gap region of the core in question.

(4) The altering of a gap dimension by tensile release of pre-stress in the vicinity of a gap.

(5) Alternating modulation of a gap length, for example, by use of an alternating field applied to a piezoelectric stress-producing device.

What is claimed is:

1. A magnetic head structure having a transducer gap the effective length of which is stress-dependent comprising (a) first and second pole pieces disposed in facing relationship with a gap therebetween, (b) means having a relatively high coefficient of magnetostriction within said gap, (c) means bonding said pole pieces and said means having a relatively high coefficient of magnetostriction into an integral assembly thereof, and (d) means coupled to said pole pieces for urging them relative to each other, thereby stressing said means having a relatively high coefficient of magnetostriction and causing the permeability of that means to change significantly.

2. A gapped magnetic head useful for a variety of purposes depending on the effective length of the gap thereof, said magnetic head comprising
(a) first and second pole pieces disposed in facing relationship with a gap therebetween,
(b) means having a relatively high coefficient of magnetostriction situated in said gap and being contiguous with the first of said pole pieces,
(c) non-magnetic means also situated in said gap and being contiguous with said means having a relatively high coefficient of magnetostriction,
(d) means bonding said pole pieces, said means having a relatively high coefficient of magnetostriction, and said non-magnetic means into an integral magnetic head assembly, and
(e) means cooperative with said integral magnetic head assembly for variably stressing the first of said pole pieces and said means having a relatively high coefficient of magnetostriction, thereby to alter the effective length of the gap that exists between said pole pieces as may be desired.

3. The magnetic head of claim 2 wherein at least one of said pole pieces is tapered toward said gap.

4. The magnetic head of claim 2 wherein said means for variably stressing said pole pieces and said means having a relatively high coefficient of magnetostriction is piezoelectric means coupled to said head for squeezing said pole pieces together in response to a voltage applied to said piezoelectric means.

5. The magnetic head of claim 4 wherein said piezoelectric means is secured to both said pole pieces and disposed so as to bridge the gap therebetween.

6. The magnetic head of claim 5 wherein said piezoelectric means is a pair of piezoelectric devices respectively secured to the opposite sides of said head in such a way that both said devices bridge said gap between said pole pieces.

7. A magnetic head comprising
(a) first and second pole pieces disposed in facing relationship with a gap therebetween, at least one of said pole pieces being tapered toward said gap and having a given quiescent permeability,
(b) non-magnetic means within said gap,
(c) means bonding said pole pieces and said non-magnetic means into an integral assembly, and
(d) means coupled to said pole pieces for urging them relative to each other, thereby altering the internal stress of said pole pieces and causing the permeability of said tapered pole pieces to change significantly.

8. The magnetic head of claim 7 wherein said means coupled to said pole pieces for urging them relative to each other is a piezoelectric device coupled to both said pole pieces and disposed across the gap therebetween.

9. A magnetic head having a gap the effective length of which is variable comprising
(a) a pair of tapered pole pieces the tapered ends of which are disposed in facing relationship with a gap therebetween,
(b) magnetostrictive material having a relatively high coefficient of magnetostriction on each of the tapered ends of said pole pieces,
(c) non-magnetic means disposed within said gap and between the material on said tapered pole piece ends,
(d) means bonding said pole pieces and said magnetostrictive and non-magnetic material into an integral assembly thereof, and
(e) means for applying compressive force to said pole pieces for varying the permeability of said magnetostrictive material, thereby to alter the effective length of the gap of said magnetic head.

10. The magnetic head of claim 9 wherein said means for applying compressive force to said pole pieces is a piezoelectric element bonded to both said pole pieces across the gap therebetween.

* * * * *